United States Patent
Yajima

(10) Patent No.: US 7,802,643 B2
(45) Date of Patent: Sep. 28, 2010

(54) INVERTER BUFFER STRUCTURE FOR A HYBRID VEHICLE

(75) Inventor: Tsutomu Yajima, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1217 days.

(21) Appl. No.: 10/574,358

(22) PCT Filed: Oct. 19, 2005

(86) PCT No.: PCT/IB2005/003122
§ 371 (c)(1),
(2), (4) Date: Mar. 30, 2006

(87) PCT Pub. No.: WO2006/054134
PCT Pub. Date: May 26, 2006

(65) Prior Publication Data
US 2009/0095557 A1    Apr. 16, 2009

(30) Foreign Application Priority Data
Oct. 20, 2004  (JP) .............................. 2004-305664

(51) Int. Cl.
*B62D 21/15*    (2006.01)
(52) U.S. Cl. .................. 180/65.22; 180/68.4; 180/68.6; 180/271; 180/274
(58) Field of Classification Search .............. 180/65.1, 180/65.2, 68.1, 68.3, 68.5, 232, 274, 291, 180/292, 296, 297, 311, 312, 65.22
See application file for complete search history.

(56) References Cited

U.S. PATENT DOCUMENTS

| | | | |
|---|---|---|---|
| 4,976,327 A * | 12/1990 | Abujudom et al. ......... | 180/68.2 |
| 5,476,151 A * | 12/1995 | Tsuchida et al. ............ | 180/274 |
| 6,402,229 B1 | 6/2002 | Suganuma | |
| 6,422,197 B1 * | 7/2002 | Amann et al. ............. | 123/198 E |
| 6,426,608 B2 * | 7/2002 | Amano et al. ............... | 320/163 |
| 6,460,642 B1 * | 10/2002 | Hirano ....................... | 180/65.1 |
| 6,827,168 B2 * | 12/2004 | Miyazaki .................... | 180/68.5 |
| 6,828,755 B1 * | 12/2004 | Iverson et al. ............... | 320/104 |
| 6,889,672 B2 * | 5/2005 | Criddle et al. ........... | 123/559.1 |
| 6,892,713 B2 * | 5/2005 | Criddle et al. ........... | 123/559.1 |
| 6,922,990 B2 * | 8/2005 | Naruse et al. ................. | 60/414 |
| 7,025,160 B2 * | 4/2006 | Awakawa ................... | 180/68.5 |
| 7,044,246 B2 * | 5/2006 | Fujieda ...................... | 180/68.4 |
| 7,145,788 B2 * | 12/2006 | Plummer .................... | 363/141 |

(Continued)

FOREIGN PATENT DOCUMENTS

EP    0 559 176 A1    9/1993

(Continued)

*Primary Examiner*—S. Joseph Morano
*Assistant Examiner*—Vaughn T Coolman
(74) *Attorney, Agent, or Firm*—Young Basile

(57) ABSTRACT

An inverter buffer structure for a vehicle is provided so that even when a head-on collision occurs, no damage is caused to the inverter case and its internal contents. In one embodiment an inverter buffer structure for a vehicle is disposed with an inverter in an engine compartment and is provided with buffer member between a surface of the inverter and a radiator core support that constitutes a portion of a frame of the vehicle to reduce an incoming force to the vehicle in the event of a collision.

8 Claims, 4 Drawing Sheets

U.S. PATENT DOCUMENTS

| | | | |
|---|---|---|---|
| 7,222,692 B2 * | 5/2007 | Masuda .................... 180/291 |
| 7,343,992 B2 * | 3/2008 | Shingo et al. ............. 180/65.1 |
| 2002/0191385 A1 | 12/2002 | Miyazaki |
| 2003/0047366 A1 * | 3/2003 | Andrew et al. ............ 180/68.5 |
| 2003/0066694 A1 | 4/2003 | Mita et al. |
| 2003/0226653 A1 * | 12/2003 | Takedomi et al. ............ 165/43 |
| 2004/0124332 A1 * | 7/2004 | Takenaka et al. ........... 248/648 |
| 2004/0159478 A1 * | 8/2004 | Masuda .................... 180/65.2 |
| 2004/0251858 A1 * | 12/2004 | Asao et al. ................. 318/139 |
| 2004/0266241 A1 * | 12/2004 | Tsukashima et al. ......... 439/212 |
| 2005/0132726 A1 * | 6/2005 | Sasaki et al. .................. 62/129 |
| 2005/0205316 A1 * | 9/2005 | Yamafuji ................... 180/68.5 |

FOREIGN PATENT DOCUMENTS

| | | |
|---|---|---|
| EP | 1 447 254 A2 | 8/2004 |
| JP | 07-101353 | 4/1995 |
| JP | 2002-362254 | 12/2002 |
| JP | 2004-175301 | 6/2004 |

* cited by examiner

FRONT OF VEHICLE ⇐

FRONT OF VEHICLE

INVERTER BUFFER STRUCTURE FOR A HYBRID VEHICLE

CROSS-REFERENCE TO RELATED APPLICATIONS

The present application claims priority under 35 U.S.C. §119 of Japanese Patent Application No. 2004-305664, filed on Oct. 20, 2004, the entire content of which is expressly incorporated by reference herein.

FIELD

The present invention relates to an inverter buffer structure used in a hybrid vehicle.

BACKGROUND

Conventionally, as described in Priuss New Car Manual, Part Number 7108100, pp. 1-9, inverters for hybrid vehicles are disposed in the front engine compartment on the left side of the vehicle.

SUMMARY

The purpose of the present invention is to solve the aforementioned problem by providing an inverter buffer structure for a vehicle so that even when a head-on collision occurs, essentially no damage is caused to the inverter case and internal contents.

For one embodiment of the invention, an inverter buffer structure for a hybrid vehicle is disposed with an inverter in a front of an engine compartment of a vehicle and is provided with a buffer member between a front surface of the inverter and a radiator core support that constitutes a portion of the frame of the vehicle to reduce an incoming force to the vehicle in the event of a head-on collision.

Therefore, when the vehicle is in a head-on collision, since the buffer member is provided between the inverter and the radiator core support, even if the radiator core support gets deformed and bent toward the rear of the vehicle, it is prevented from directly impacting the front surface of the inverter. Thus, by buffering the impact applied to the front surface of the inverter by the radiator core support, damage to the inverter case and internal contents can be prevented.

For another embodiment, a hybrid vehicle is configured such that the engine is disposed on the right side of the vehicle and the inverter on the left side, but if the positional relationship of the engine and inverter were the opposite of this, needless to say, the inverter would be disposed on the right side of the vehicle.

EXPLANATION OF THE REFERENCE SYMBOLS

Figure 1A:
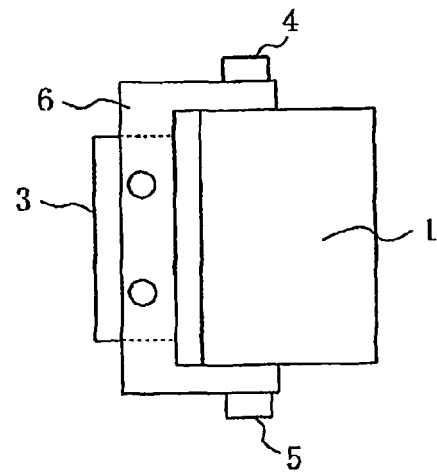
FIGS. 1a and 1b are respectively top and side views of a type diagram of one embodiment of an inverter buffer structure for a hybrid vehicle that pertains to the present invention.

1. Inverter
2. Radiator core support
3. Buffer member
4. Bolt
5. Bolt
6. Bracket
7. Flat plate
8. Inverter tray
9. Bent plate
10. Clip
11. Transaxle
12. Inverter protecting bumper
13. Engine
14. Engine control unit
15. Resonator
16. Air intake duct
17. Air cleaner
51. Inverter
52. Engine
53. Transaxle
54. Radiator core support

DETAILED DESCRIPTION

Next, a detailed explanation of the most favorable configuration for the present invention is provided with reference to the Figures.

Figure 1B:
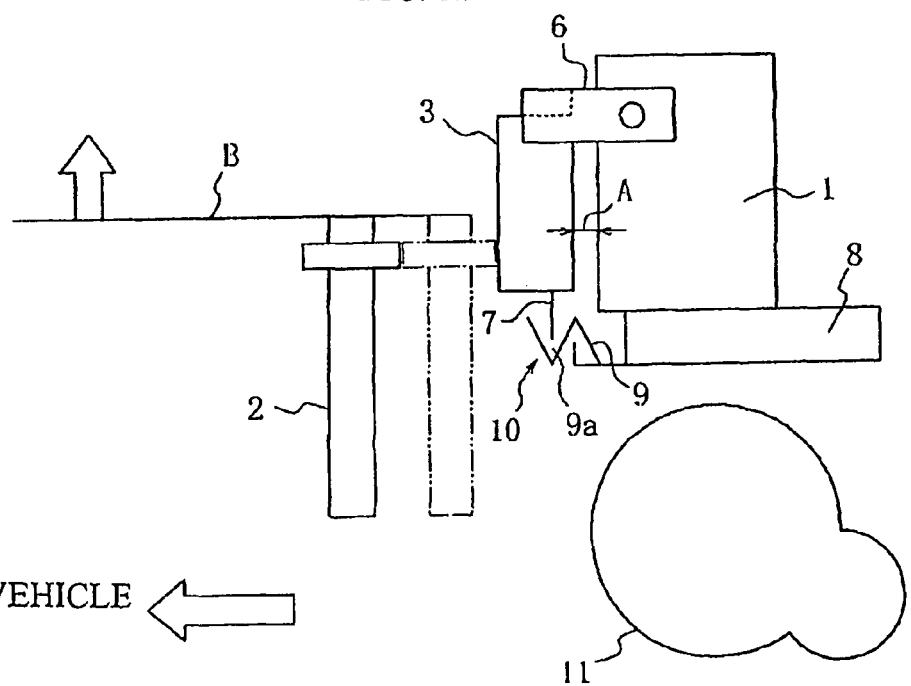

FIGS. 1a and 1b are respectively top and side views of a type diagram, according to one embodiment of an inverter buffer structure for a hybrid vehicle pertaining to the present invention. As shown in FIGS. 1a and 1b, this inverter buffer structure for a hybrid vehicle is disposed with an inverter 1 in a front engine compartment on the left side of the vehicle and is provided with buffer member 3 between the front surface of inverter 1 and radiator core support 2 that constitutes a portion of a frame of the vehicle to reduce the incoming force to the vehicle in the event of a head-on collision.

Figure 2:
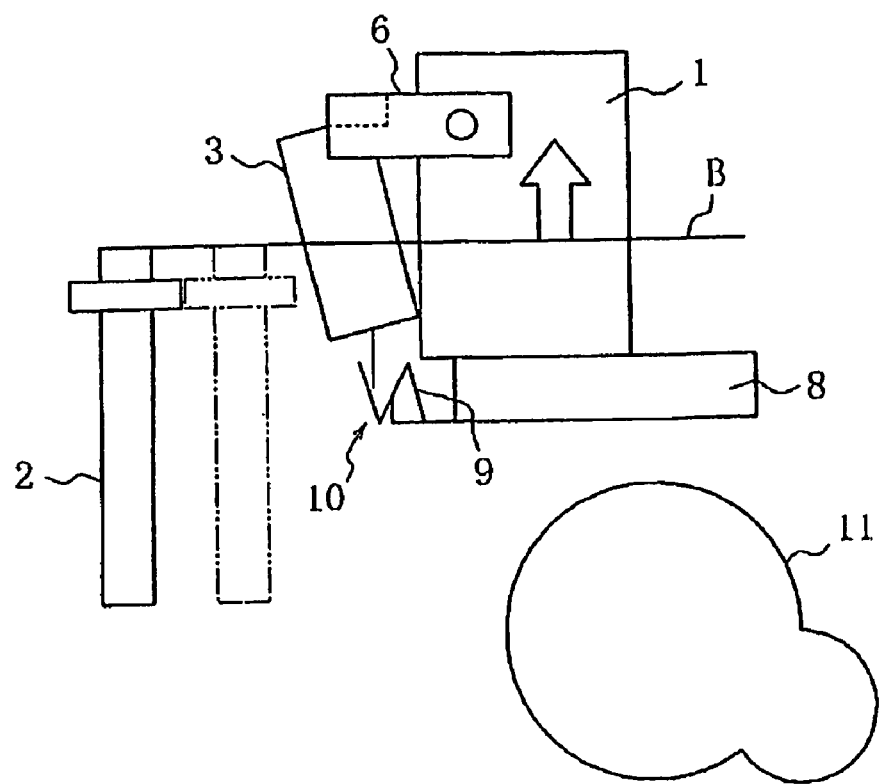
FIG. 2 is a type diagram showing the operating effects of the inverter buffer structure for a hybrid vehicle that pertains to the present invention.

Therefore, as shown by the dashed-dotted lines in FIG. 2, when the vehicle is in a head-on collision, buffer member 3 acts to prevent radiator core support 2 from directly impacting the front surface of inverter 1 when core support 2 gets deformed and bent toward the rear of the vehicle. Thus, buffer member 3 buffers the impact applied to the front surface of inverter 1 by radiator core support 2, and acts to prevent damage to the case and internal contents of inverter 1.

As shown in FIG. 1a, buffer member 3 is supported by using bolts (not shown in the Figure) that fasten buffer member 3, in two places, to U-shaped bracket 6, which is securely fastened to inverter 1 itself by bolts 4 and 5 located on the sides of the vehicle. Therefore, compared to providing buffer member 3 on radiator core support 2, securely fastening buffer member 3 on the front surface of inverter 1 itself securely disposes buffer member 3 between radiator core support 2 and inverter 1 so that even if a head-on collision occurs and radiator core support 2 gets bent toward the rear of the vehicle, radiator core support 2 is substantially absolutely prevented from directly impacting the front surface of inverter 1. Thus, by securely buffering the impact applied to the front surface of inverter 1 by radiator core support 2, damage to the case and internal contents of inverter 1 can be substantially absolutely prevented.

In addition, as shown in FIG. 1*b*, a prescribed space A may be provided between buffer member 3 and inverter 1 in the front-to-rear direction of the vehicle. Therefore, compared to when a space is not provided between buffer member 3 and inverter 1, space A provides some leeway between when radiator core support 2 contacts buffer member 3 as core support 2 moves toward the rear of the vehicle during a head-on collision, as shown by the dashed-dotted lines in FIG. 2, and when buffer member 3 gets pushed up against the front surface of inverter 1 and begins to get pressed and sandwiched between inverter 1 and radiator core support 2. This acts to further reduce the likelihood of damage to the case and internal contents of inverter 1.

Furthermore, as shown in FIG. 1*b*, U-shaped bracket 6 is positioned so that it is higher than upper surface B of radiator core support 2. Therefore, as shown by the dashed-dotted lines in FIG. 2, when a head-on collision occurs, contact between radiator core support 2 and U-shaped bracket 6 can be avoided so that the impact from the head-on collision is not passed directly to inverter 1 via bracket 6, and damage to the case and internal contents of inverter 1 can be prevented.

In addition, as shown in FIG. 1*b*, a flat plate 7 that extends perpendicular with the front-to-rear direction of the vehicle is provided on the lower surface of buffer member 3 as a restraining means for restraining the lower surface of buffer member 3 in the front-to rear-position of the vehicle. A bent plate 9 that bends in either a zigzag or an "S" shape when viewed from the side of the vehicle is provided on a front end of an inverter tray 8, which supports the lower surface of inverter 1. A clip 10 is formed from flat plate 7 and bent plate 9 by fitting flat plate 7 into indented portion 9*a* of bent plate 9.

Therefore, although clip 10 restrains buffer member 3 with some degree of rigidity in the front-to-rear direction of the vehicle under ordinary driving conditions, it has less supporting rigidity than U-shaped bracket 6 in a head-on collision.

Figure 6A:
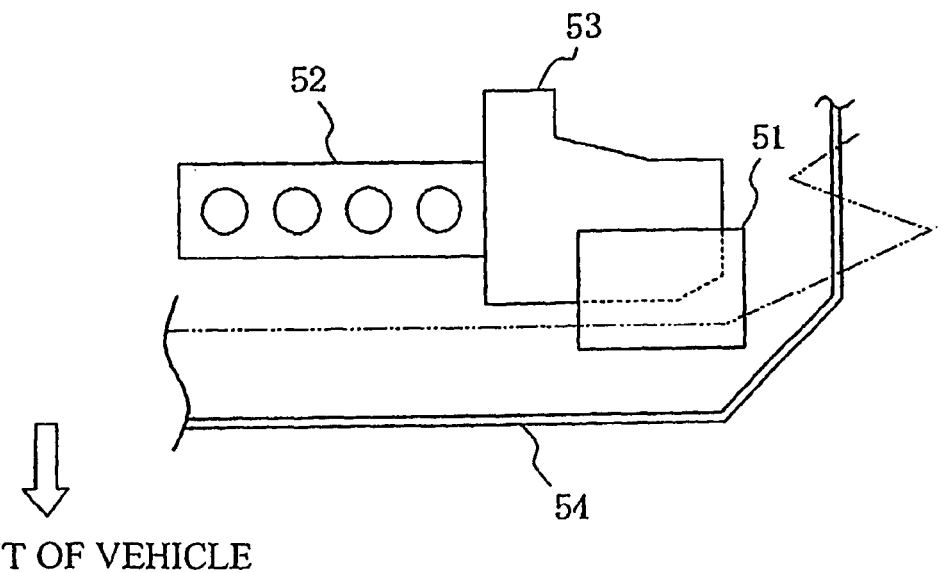
FIGS. 6a and 6b are respectively top and side views of a type diagram showing the vehicle fastening structure for the inverter of a hybrid vehicle.
Figure 6B:
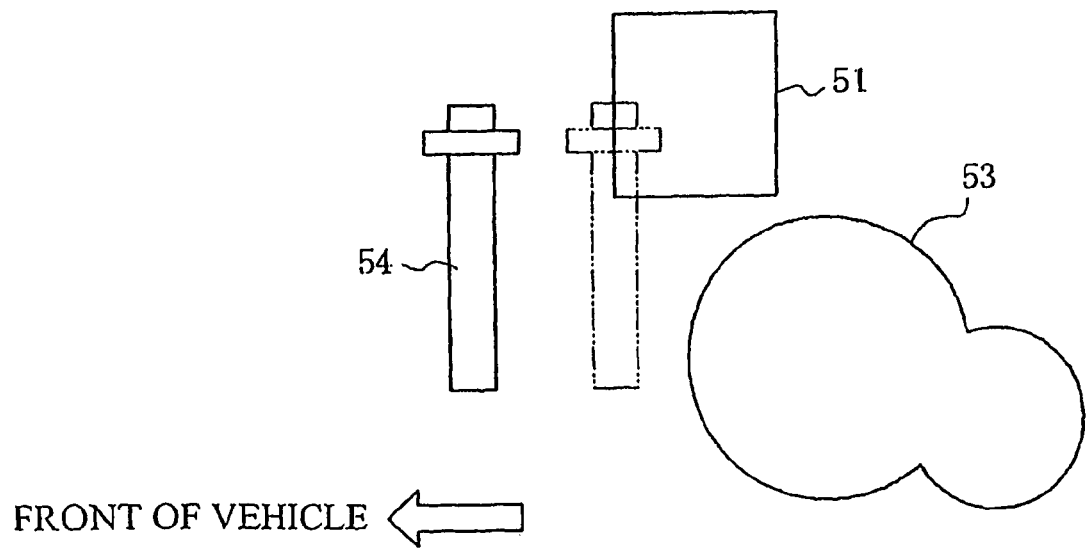

On the other hand, as shown in FIGS. 6*a* and 6*b* (respectively top and side views the vehicle) a configuration is generally employed in which the base of inverter 51 is fastened to a side member, not shown in FIGS. 6*a* and 6*b*, that extends in the front-to-rear direction of the body of the vehicle via a plate-shaped inverter tray, also not shown in FIGS. 6*a* and 6*b*. The engine 52 is shown in FIG. 6*a*, and the transaxle 53 is shown in FIGS. 6*a* and 6*b*.

However, for this type of configuration, when the vehicle is in a head-on collision, radiator core support 54, which constitutes a portion of the frame of the vehicle, gets deformed and is bent toward the rear of the vehicle, as indicated the by dashed-dotted lines in FIGS. 6*a* and 6*b*. Therefore, radiator core support 54 impacts the front surface of inverter 51, causing a problem in that the case and internal contents of inverter 51 become damaged.

Therefore, as shown by the dashed-dotted lines in FIG. 2, as radiator core support 2 moves toward the rear of the vehicle, clip 10 moves toward the rear of the vehicle by the same amount, and bent plate 9 and inverter tray 8 act to prevent the impact in the front-to-rear direction of the vehicle from passing directly to inverter 1 when a head-on collision occurs. In addition, when the vehicle is in a head-on collision, since buffer member 3 is securely disposed between radiator core support 2 and the front surface of inverter 1, the portion of radiator core support 2 that gets bent toward the rear of the vehicle is prevented from directly impacting the front surface of inverter 1. Thus, by buffering the impact applied to the front surface of inverter 1 by radiator core support 2, damage to the case and internal contents of inverter 1 can be substantially absolutely prevented.

Figure 3:
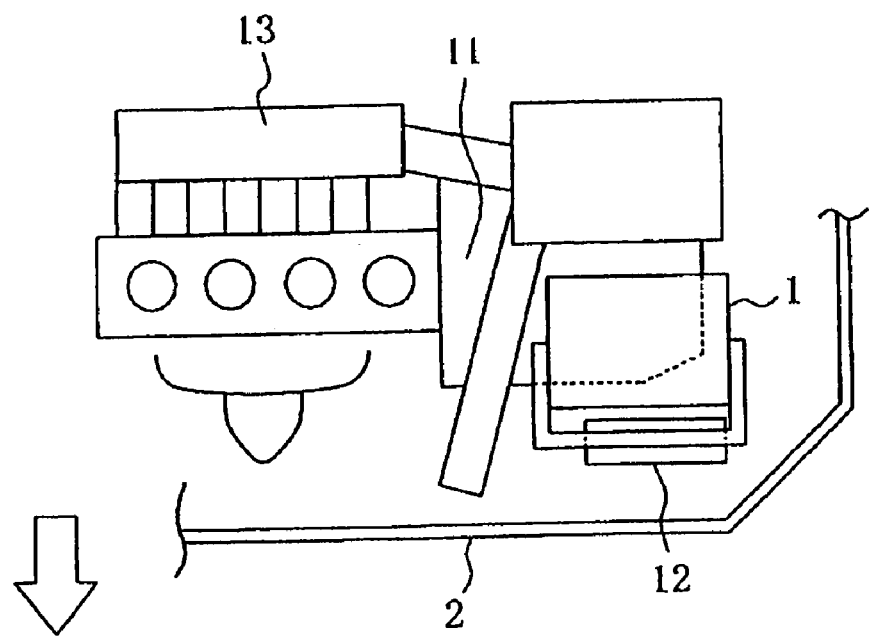
FIG. 3 is a plan view of a type diagram showing one embodiment of the buffer member for the inverter buffer structure for a hybrid vehicle that pertains to the present invention.
Figure 4:
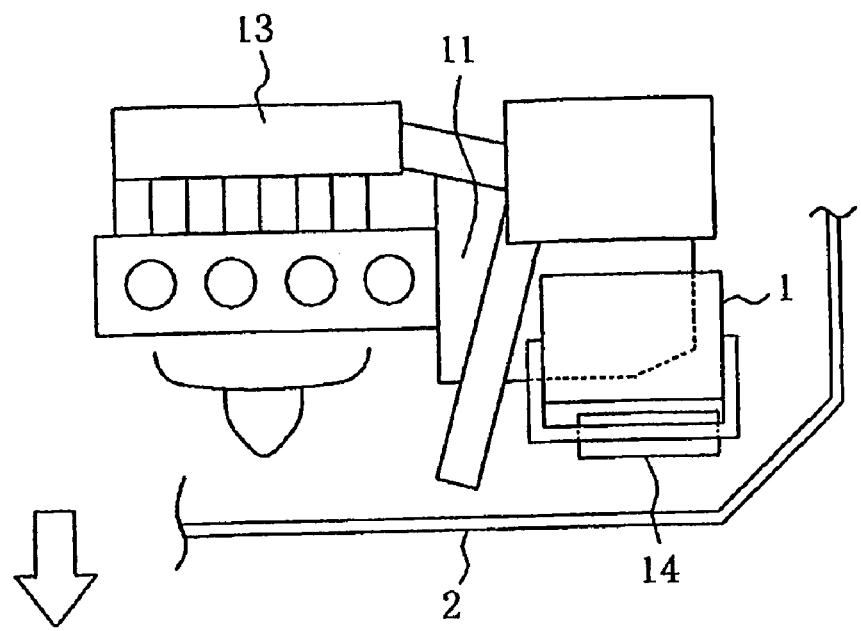
FIG. 4 is a plan view of a type diagram showing another embodiment of the buffer member for the inverter buffer structure for a hybrid vehicle that pertains to the present invention.
Figure 5:
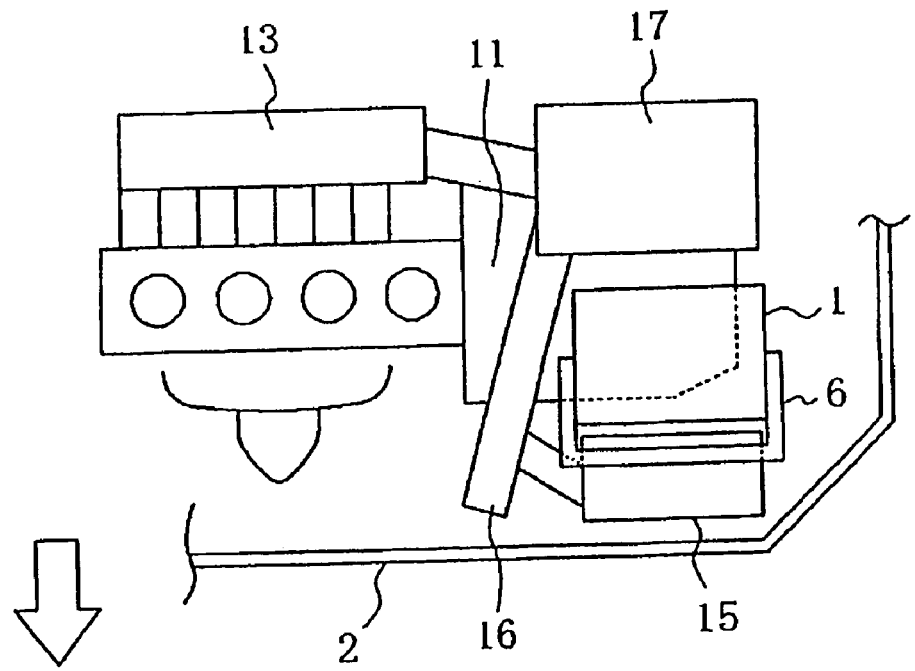
FIG. 5 is a plan view of a type diagram showing yet another embodiment of the buffer member for the inverter buffer structure for a hybrid vehicle that pertains to the present invention.

FIGS. 3 through 5 are plan views of type diagrams of concrete embodiments of the aforementioned buffer member for the inverter buffer structure for a hybrid vehicle pertaining to the present invention. In FIG. 3, the buffer member is a custom inverter protecting bumper 12. A transaxle 11 and an engine 13 are also shown in FIG. 3. In FIG. 4, the buffer member is engine controller unit 14. For example, ABS (Antilock Brake System) control unit, VDC (Vehicle Dynamic Control) control unit and 4WD (4 Wheel Drive) control unit may be substituted for the engine control unit. A transaxle 11 and an engine 13 are also shown in FIG. 4. In FIG. 5, the buffer member is resonator 15 (air intake part). Resonator 15 supplies fresh air to engine 13 via air intake duct 16 and air cleaner 17.

As explained above, although the effect of preventing damage to the case and internal contents of inverter 1 is achieved by any one of these embodiments, because an existing part is used as the buffer in the embodiments shown in FIGS. 4 and 5, a more advantageous configuration can be achieved in terms of reducing the number of parts required and the weight of the vehicle, compared to when the custom inverter protecting bumper 12 shown in FIG. 3 is provided.

The inverter buffer structure for a vehicle that pertains to the present invention provides more safety in the event that a head-on collision occurs and also improves the reliability of the vehicle.

CONCLUSION

Although specific embodiments have been illustrated and described herein, it will be appreciated by those of ordinary skill in the art that any arrangement, which is calculated to achieve the same purpose, may be substituted for the specific embodiment shown. For example, electric vehicle and fuel cell vehicle may be substituted for the hybrid vehicle. This application is intended to cover any adaptations or variations of the present invention. Therefore, it is manifestly intended that this invention be limited only by the claims and the equivalents thereof.

What is claimed is:

1. An inverter buffer structure for a vehicle, comprising:
   an inverter disposed in a compartment of the vehicle;
   a radiator core support that constitutes a frame portion of the vehicle; and
   a buffer member that is disposed directly adjacent to the inverter and is disposed directly adjacent to the radiator core support, such that the buffer member is disposed between the inverter and the radiator core support, wherein deflection of the radiator core support in a front-to-rear direction of the vehicle during a head-on collision of the vehicle causes engagement of the buffer member with the radiator core support and the inverter such that the buffer member reduces the amount of an incoming force that is applied to the inverter during the collision, wherein the buffer member is supported by a bracket provided on the inverter itself, and an open space is provided between the buffer member and the inverter to allow movement of the buffer member with respect to the inverter in the front-to-rear direction of the vehicle during the collision.

2. The inverter buffer structure of claim 1, wherein a restraining means is provided to restrain a lower surface of the buffer member in a front-to-rear direction of the vehicle, the restraining means having lower rigidity that the bracket such that the restraining means deforms more readily than the bracket during the collision.

3. The inverter buffer structure of claim 2, wherein the bracket is positioned higher than an upper surface of the radiator core support such that the radiator core support does not engage the bracket during the collision, and an upper end of the buffer member is connected to the bracket such that the buffer member extends downwardly from the bracket.

4. The inverter buffer structure of claim 1, wherein the bracket is positioned higher than an upper surface of the radiator core support such that the radiator core support does not engage the bracket during the collision, and an upper end of the buffer member is connected to the bracket, such that the buffer member extends downwardly from the bracket.

5. An inverter buffer structure for a vehicle, comprising:
an inverter disposed in a compartment of the vehicle;
a radiator core support that constitutes a frame portion of the vehicle; and
a buffer member that is disposed directly adjacent to the inverter and is disposed directly adjacent to the radiator core support, such that the buffer member is disposed between the inverter and the radiator core support, wherein deflection of the radiator core support in a front-to-rear direction of the vehicle during a head-on collision of the vehicle causes engagement of the buffer member with the radiator core support and the inverter such that the buffer member reduces the amount of an incoming force that is applied to the inverter during the collision, wherein the buffer member is supported by a bracket provided on the inverter itself, and a restraining means is provided to restrain a lower surface of the buffer member in the front-to-rear direction of the vehicle, the restraining means having lower rigidity that the bracket such that the restraining means deforms more readily than the bracket during the collision.

6. An inverter buffer structure for a vehicle, comprising:
an inverter disposed in a compartment of the vehicle;
a radiator core support that constitutes a frame portion of the vehicle; and
a buffer member that is disposed directly adjacent to the inverter and is disposed directly adjacent to the radiator core support, such that the buffer member is disposed between the inverter and the radiator core support, wherein deflection of the radiator core support in a front-to-rear direction of the vehicle during a head-on collision of the vehicle causes engagement of the buffer member with the radiator core support and the inverter such that the buffer member reduces the amount of an incoming force that is applied to the inverter during the collision, wherein the buffer member is supported by a bracket provided on the inverter itself, and the bracket is positioned higher than an upper surface of the radiator core support such that the radiator core support does not engage the bracket during the collision, and an upper end of the buffer member is connected to the bracket, such that the buffer member extends downwardly from the bracket.

7. A method of protecting an inverter of a vehicle during a head-on collision of the vehicle, comprising:
disposing a buffer member directly adjacent to the inverter and a radiator core support that constitutes a frame portion of the vehicle by connecting the buffer member to the inverter using a bracket such that the buffer member is disposed between the inverter and the radiator core support, and restraining a lower portion of the buffer member in a front-to-rear direction of the vehicle using a structure having lower rigidity that the bracket such that the structure deforms more readily than the bracket during the collision, wherein deflection of the radiator core support in a front-to-rear direction of the vehicle during a head-on collision of the vehicle causes engagement of the buffer member with the radiator core support and the inverter such that the buffer member reduces the amount of an incoming force that is applied to the inverter during the collision.

8. A method of protecting an inverter of a vehicle, comprising:
disposing a buffer member directly adjacent to the inverter and a radiator core support that constitutes a frame portion of the vehicle by connecting the buffer member to the inverter using a bracket such that the buffer member is disposed between the inverter and the radiator core support and positioning the bracket higher than the upper surface of the radiator core support such that the radiator core support does not engage the bracket during a head-on collision of the vehicle, and an upper end of the buffer member is connected to the bracket, such that the buffer member extends downwardly from the bracket, wherein deflection of the radiator core support in a front-to-rear direction of the vehicle during the collision causes engagement of the buffer member with the radiator core support and the inverter such that the buffer member reduces the amount of an incoming force that is applied to the inverter during the collision.

* * * * *